(12) United States Patent
Cossette et al.

(10) Patent No.: US 9,186,746 B2
(45) Date of Patent: Nov. 17, 2015

(54) JUMP LINER FOR PUSH-PULL MIG TORCH

(75) Inventors: Romeo N. Cossette, Windsor (CA); Tiejun Ma, Tecumseh (CA); Craig M. Bondy, Tecumseh (CA); Jeffery K. Arcand, Lasalle (CA); Paul W. Garvey, Kaukauna, WI (US); Chris Roehl, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 371 days.

(21) Appl. No.: 13/616,808

(22) Filed: Sep. 14, 2012

(65) Prior Publication Data

US 2014/0076874 A1   Mar. 20, 2014

(51) Int. Cl.
| | |
|---|---|
| *B23K 9/10* | (2006.01) |
| *B23K 9/12* | (2006.01) |
| *B23K 9/26* | (2006.01) |
| *B23K 9/29* | (2006.01) |

(52) U.S. Cl.
CPC .. *B23K 9/26* (2013.01); *B23K 9/295* (2013.01)

(58) Field of Classification Search
CPC .......................... B23K 9/29–9/298; B23K 9/26
USPC ......................................... 219/137.2–137.63
See application file for complete search history.

(56) References Cited

U.S. PATENT DOCUMENTS

| | | | |
|---|---|---|---|
| 2,817,749 A | 12/1957 | Flood et al. | |
| 3,529,126 A * | 9/1970 | Reeh | 219/137.62 |
| 4,158,763 A * | 6/1979 | Moerke | 219/137.42 |
| 4,554,432 A * | 11/1985 | Raloff | 219/137.43 |
| 4,624,410 A * | 11/1986 | Rogers | 239/83 |
| 5,491,321 A * | 2/1996 | Stuart et al. | 219/137.61 |
| 6,462,309 B1 | 10/2002 | Wimroither | |

FOREIGN PATENT DOCUMENTS

GB    1437456    5/1976

* cited by examiner

*Primary Examiner* — Sang Y Paik
(74) *Attorney, Agent, or Firm* — Fildes & Outland, P.C.

(57) ABSTRACT

A jump liner for a push-pull MIG welding torch includes an elongated tubular body having front and back ends. The tubular body is made of a flexible plastic material. A front adapter is disposed at the front end of the tubular body. The front adapter is fittable in a retaining head of the torch. A back adapter is disposed at the back end of the tubular body. The back adapter is fittable in a gooseneck or body block of the welding torch. The front adapter provides sealing between the jump liner and the retaining head to prevent back flow leakage of shielding gas, and the front adapter prevents deformation of the tubular body at elevated temperatures. The back adapter provides sealing between the jump liner and the gooseneck or body block.

7 Claims, 5 Drawing Sheets

JUMP LINER FOR PUSH-PULL MIG TORCH

TECHNICAL FIELD

This invention relates to push-pull MIG welding torches, and more particularly to a jump liner for a push-pull welding torch.

BACKGROUND OF THE INVENTION

A push-pull MIG welding system generally includes a wire feeder, and a welding torch connected to the wire feeder. Electrode welding wire (typically aluminum), shielding gas, welding current, and/or coolant are transferred inside the welding torch. The welding torch includes a handle connected at a rear end to a cable assembly and at a front end to a gooseneck which terminates in a contact tip assembly. The wire feeder includes a pushing drive roll mechanism that pushes the welding wire through the cable assembly to the handle. A pulling drive roll mechanism in the torch handle pulls the welding wire from the cable assembly and sends it forward through the gooseneck to the contact tip assembly. A tubular jump liner typically extends from the torch handle to the contact tip assembly to protect the welding wire as it travels through the gooseneck.

It is known in the art relating to push-pull MIG welding torches that the pulling drive roll mechanism in the handle of the torch is open to free space inside the handle. Thus, the inner diameter (ID) of the jump liner, inside which the electrode wire transits, is also open to the free space at this end. In order to deliver shielding gas through the gooseneck to the contact tip assembly, sealing is required between the jump liner and the gooseneck along the whole length of the jump liner. Current push-pull MIG torch designs provide adequate sealing between the jump liner and the gooseneck or body block inside the handle, but do not provide sealing between the jump liner and the retaining head or contact tip at the front end.

In order to reduce shaving between the jump liner and aluminum welding wire, most jump liners are made of plastic materials such as PTFE, nylon, and the like. One characteristic of plastic jump liners is the large dimensional variation based on factors such as temperature, humidity, and manufacturing. Therefore, significant gaps are required between a plastic jump liner and the metal parts of the welding torch to allow for expansion and contraction of the jump liner. These gaps, however, provide undesirable leakage channels for shielding gas. If a plastic jump liner is cut too short, the gap between the jump liner and the retaining head of the contact tip assembly allows for back flow of pressurized shielding gas into the jump liner and escape at the rear end of the jump liner (the end towards the pulling drive rolls inside the torch handle). On the other hand, if the jump liner is cut too long, the resiliency of the jump liner causes the front end of the jump liner to mushroom or even close. This effect is more pronounced when the front end of the torch is hot, which softens the jump liner. In any event, this results in a closing of the internal space between the jump liner and the electrode wire, eventually jamming the wire.

SUMMARY OF THE INVENTION

The present invention is a jump liner for a push-pull MIG welding torch that provides proper sealing while tolerating the properties of plastic materials. The jump liner provides a seal between itself and the gooseneck/body block on one end, and between itself and the retaining head/contact tip of the contact tip assembly on the other end. The jump liner also protects the plastic tubular body of the jump liner so that it will not close due to deformation at the front end (contact tip end) at elevated temperatures. The jump liner has good tolerance of variations in the length of the plastic tubular body.

More specifically, a jump liner for a push-pull MIG welding torch in accordance with the present invention includes an elongated tubular body having front and back ends. The tubular body is made of a flexible plastic material. A front adapter is disposed at the front end of the tubular body. The front adapter is fittable in a retaining head of the torch. A back adapter is disposed at the back end of the tubular body. The back adapter is fittable in a gooseneck or body block of the welding torch. The front adapter provides sealing between the jump liner and the retaining head to prevent back flow leakage of shielding gas, and the front adapter prevents deformation of the tubular body at elevated temperatures. The back adapter provides sealing between the jump liner and the gooseneck/body block.

In a specific embodiment, the front adapter and the back adapter are made of metal and are heat resistant. The front adapter is generally cylindrical and includes a flanged portion at an inner end (towards the middle of the jump liner) and an elongated smaller diameter portion at an outer end (towards the front end of the jump liner), the elongated smaller diameter portion having a smaller outer diameter than an outer diameter of the flanged portion. The flanged portion may include a corrugated outer surface, for example, a knurled surface. The back adapter is generally cylindrical and includes a shoulder. The shoulder includes a recess and a seal retained therein. The seal may be an O-ring.

A push-pull MIG welding torch in accordance with the present invention includes a handle and a gooseneck having front and back ends. The handle is connected to the back end of the gooseneck. A contact tip assembly is connected to the front end of the gooseneck. A jump liner extends through the gooseneck from the handle to the contact tip assembly. The jump liner includes an elongated tubular body having front and back ends. The tubular body is made of a flexible plastic material. A front adapter is disposed at the front end of the tubular body. The front adapter is fittable in a retaining head of the torch. A back adapter is disposed at the back end of the tubular body. The back adapter is fittable in a gooseneck or body block of the welding torch. The front adapter provides sealing between the jump liner and the retaining head to prevent back flow leakage of shielding gas, and the front adapter prevents deformation of the tubular body at elevated temperatures. The back adapter provides sealing between the jump liner and the gooseneck/body block.

These and other features and advantages of the invention will be more fully understood from the following detailed description of the invention taken together with the accompanying drawings.

DETAILED DESCRIPTION OF THE INVENTION

Figure 1:
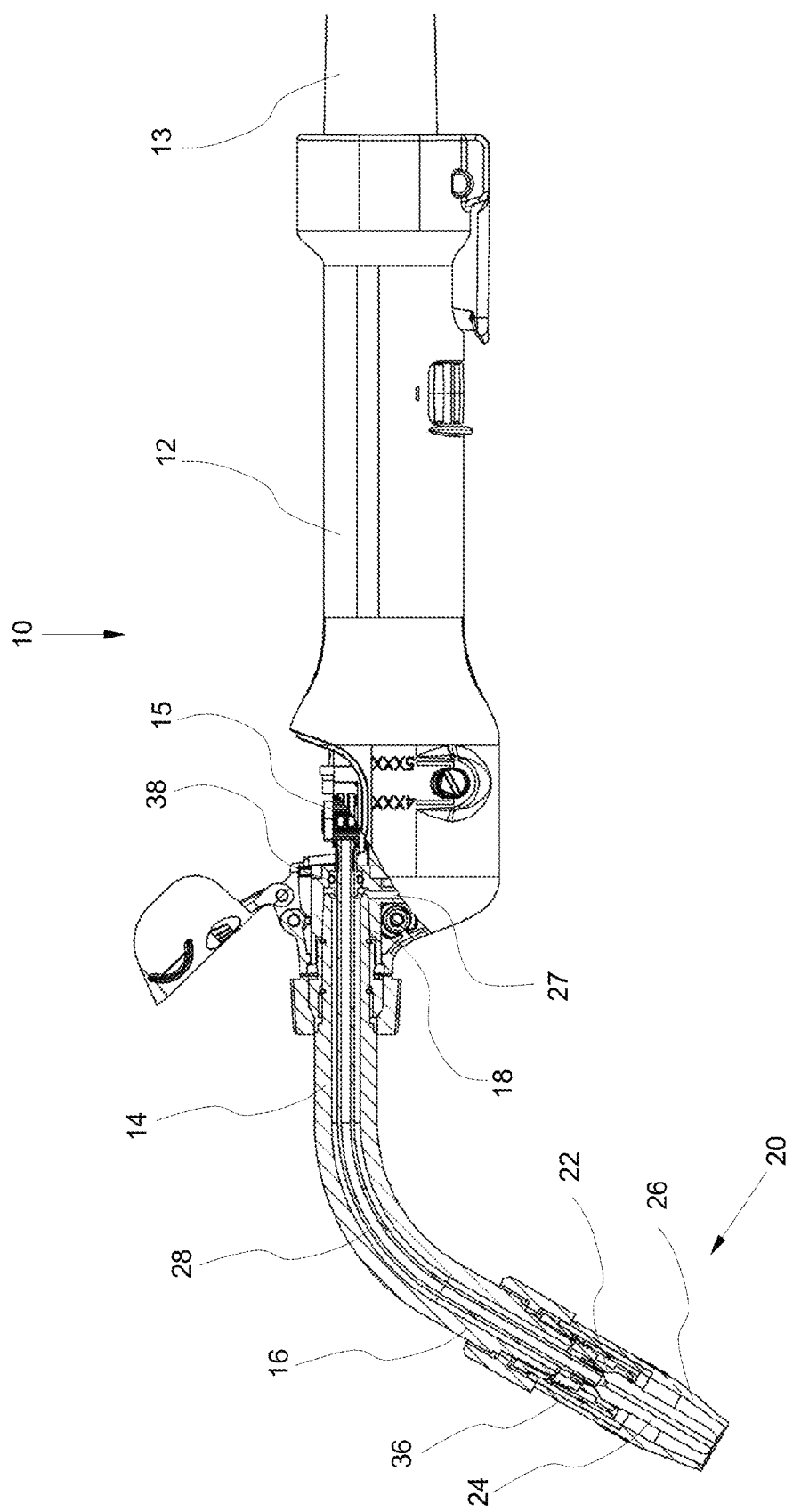
FIG. 1 is a side, partially cutaway view of front components of a push-pull MIG welding torch in accordance with the present invention, including a handle, gooseneck, and contact tip assembly.

Referring now to the drawings in detail, numeral 10 generally indicates a push-pull MIG welding torch. The push-pull MIG welding torch 10 includes a jump liner in accordance with the present invention. The jump liner according to the present invention provides proper sealing for preventing leakage of shielding gas, while also tolerating the properties of plastic materials which typically form the jump liner. The jump liner also protects the plastic tubular body of the jump liner so that it will not close at the front end (contact tip end) at elevated temperatures. The jump liner is also more tolerant of variations in the length of the plastic tubular body.

As shown in FIG. 1, the push-pull MIG welding torch 10 generally includes a handle 12 and a gooseneck 14 having a front end 16 and a back end 18. The handle 12 is connected to the torch cable assembly 13 at one end and to the back end 18 of the gooseneck at the other end. A contact tip assembly 20 is connected to the front end 16 of the gooseneck 14. The contact tip assembly 20 includes a retaining head 22 mateable with a contact tip 24, and a nozzle 26 that generally covers the contact tip.

A jump liner 28 extends through the gooseneck 14 from the handle 12 to the contact tip assembly 20. The shielding gas travels in the gap between the outer diameter (OD) of the jump liner 28 and the inner diameter (ID) of the gooseneck 14, through the diffusing hole 54 (shown in FIG. 5), and towards the outlet 56 of the contact tip assembly 20. The electrode welding wire (not shown) is driven by the driving gear 15, through the ID of the jump liner 28, into the ID of the contact tip 24, and eventually to the welding arc in front of the contact tip.

Figure 2:
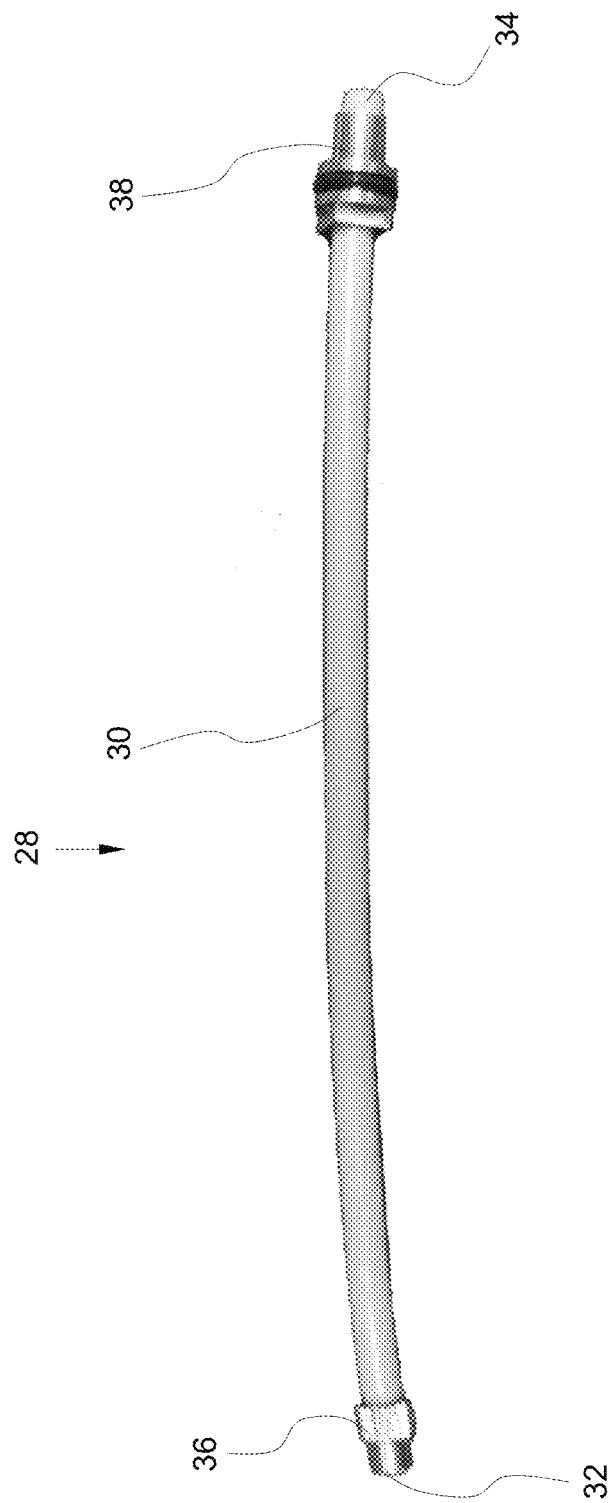
FIG. 2 is a perspective view of a jump liner in accordance with the present invention for the push-pull MIG welding torch.
Figure 3:
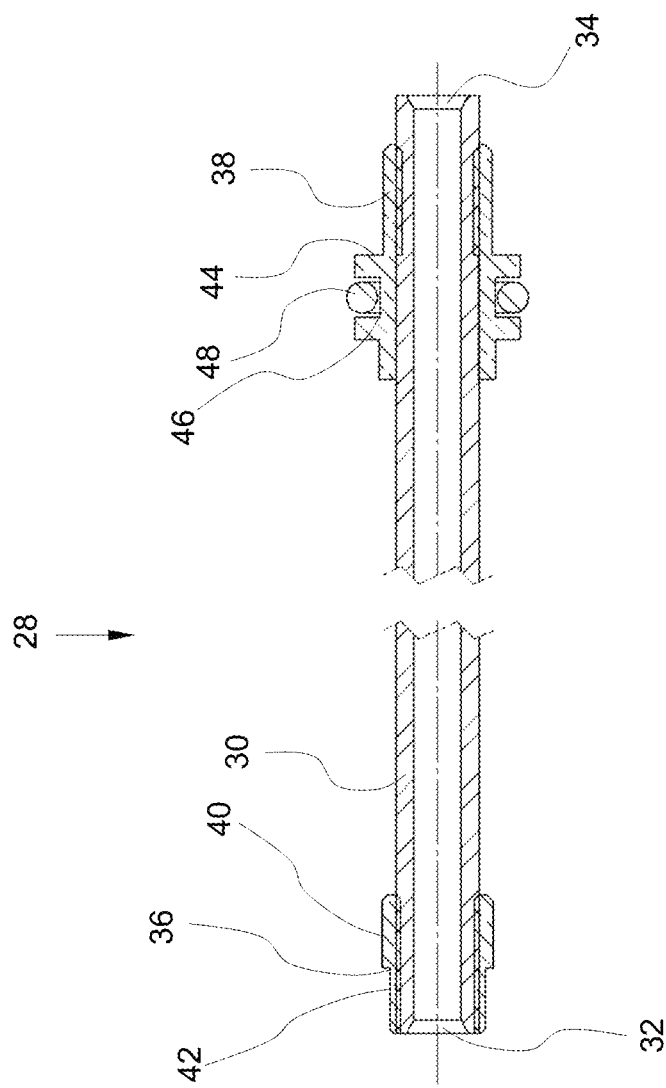
FIG. 3 is a sectional view of the jump liner of FIG. 2.

As shown in FIGS. 2 and 3, the jump liner 28 includes an elongated tubular body 30 having a front end 32 and an opposite back end 34. The tubular body 30 is made of a flexible plastic material such as but not limited to PTFE, nylon, PE, or similar.

A front adapter 36 is disposed at the front end 32 of the tubular body 30. The front adapter 36 is fitable in the retaining head 22 of the welding torch 10. The front adapter 36 is made of a metal material and is heat resistant (capable of withstanding high temperatures). In a specific embodiment, the front adapter 36 is generally cylindrical and includes a flanged (large OD) portion 40 at an inner end and an elongated smaller diameter (smaller OD) portion 42 at an outer end having a smaller OD than the flanged portion. The flanged portion 40 includes a corrugated (e.g., knurled) outer surface. The front adapter 36 is thread fit with the tubular body 30. This allows adjustment of the total length of the jump liner 28, and makes it more tolerant to all the dimensional variations, including but not limited to the length of the tubular body 30, the length of the gooseneck 14, as well as the relative position of the retaining head 22 to the gooseneck 14.

A back adapter 38 is disposed at the back end 34 of the tubular body 30. In a specific embodiment, the back adapter 38 is generally cylindrical and includes a shoulder 44. The shoulder 44 includes a recess 46. A seal such as an O-ring 48 or similar is retained in the recess 46.

Figure 4:
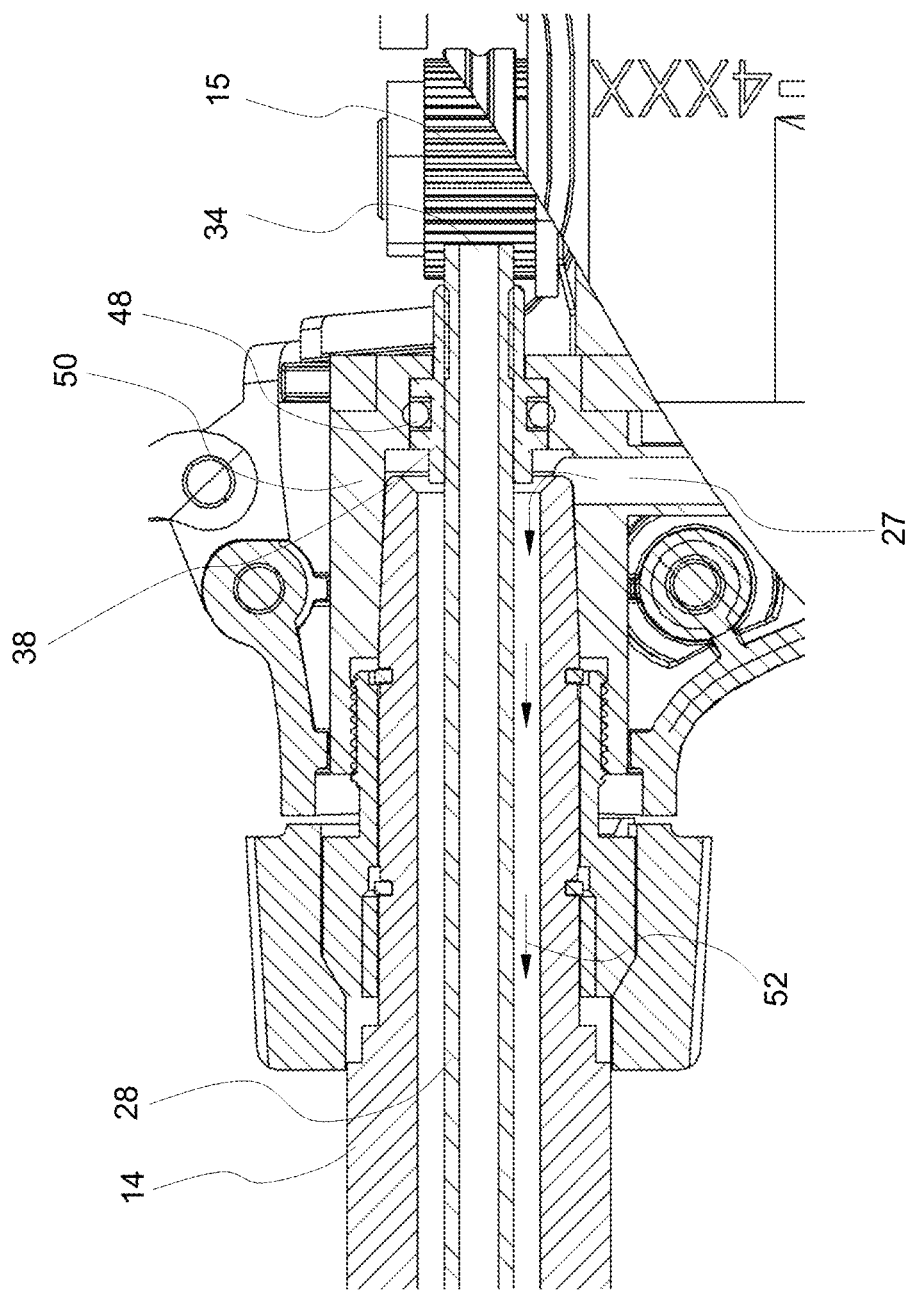
FIG. 4 is an enlarged cutaway view of the push-pull MIG welding torch of FIG. 1 illustrating the gooseneck, body block assembly, and back end of the jump liner in accordance with the invention.

FIG. 4 shows the fitting of the back end of the jump liner. The back adaptor 38 of jump liner 28 fits into the body block 50 inside the handle. The electrode wire (not shown) is fed by the driving gear 15, into the back end 34 of the jump liner 28. The shielding gas is fed at the inlet port 27, through the gap between the OD of the jump liner 28 and the ID of the gooseneck 14, towards the contact tip assembly 20. The drive gear 15 and the electrode wire are open to the free space, as well as the ID of the jump liner 28 at the back end 34. The O-ring 48 of the jump liner prevents the shielding gas (shown by arrows 52) from escaping to the open space inside the handle.

Figure 5:
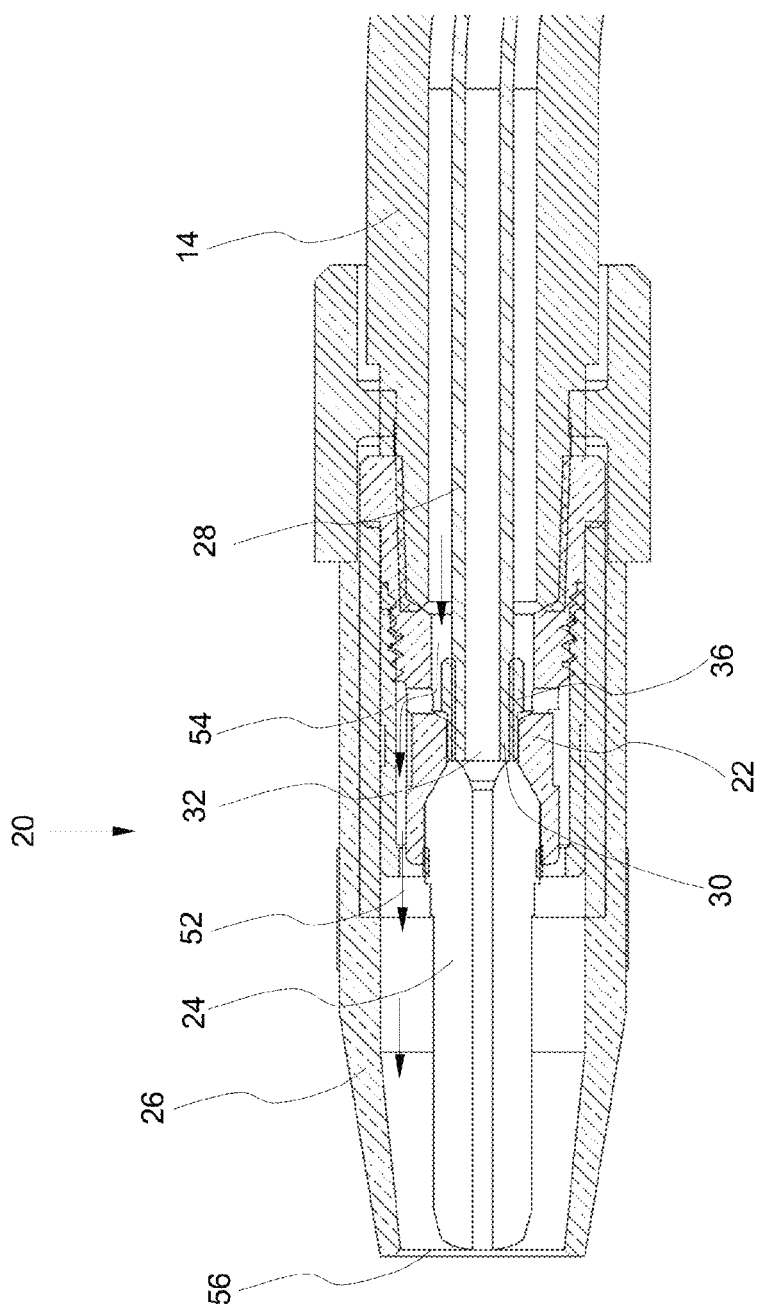
FIG. 5 is an enlarged sectional view of the push-pull MIG welding torch of FIG. 1 illustrating the contact tip assembly and front end of the jump liner in accordance with the invention.

FIG. 5 shows the fitting of the front end of jump liner. The front adaptor 36 of the jump liner 28 fits into the ID of the retaining head 22. The shielding gas comes from the gap between the OD of the jump liner 28 and the ID of the gooseneck 14, through the diffusing hole 54, towards the outlet 56 of the contact tip assembly 20. The front adapter 36 is accurately machined, leaves a minimal gap at its interface with the retaining head and contact tip. This prevents the shielding gas 52 from getting into the front end 32 of the jump liner and escaping backwards to the open space.

The total length of the jump liner 28 may be made slightly longer than necessary so that it is slightly compressed at its front and back ends 32, 34, by the retaining head/contact tip and body block, respectively. This ensures proper sealing at both ends. The thread fitting between the front adaptor 36 and the tubular body 30 allows adjustment of the total length of the jump liner 28. For example, the front adaptor 36 can be threaded out to make the total length longer. Thus, the length of the tubular body 30 can have a wide tolerance range. The "necessary" length of the jump liner 28 is also affected by dimensions of other components, such as the length of the gooseneck 14 and the relative position of the retaining head 22 to the gooseneck 14. With the thread fitting between the front adaptor 36 and tubular body 30, the total length of the jump liner can be adjusted to fit each individual torch.

The front adapter 36 also prevents deformation (e.g., softening due to heat) of the tubular body 30 at elevated temperatures during use of the welding torch 10. The heat resistant front adaptor 36 absorbs the compression force between the jump liner and retaining head or contact tip, so the plastic body 30 is not pushed on the front end surface. Thus, the front adapter extends the useful life of the jump liner.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A jump liner for a push-pull MIG welding torch, the jump liner comprising:
   an elongated tubular body having front and back ends, the tubular body being made of a flexible plastic material;
   a front adapter disposed at and mounted on the front end of the tubular body and thread fit on the tubular body, the front adapter being fitable in a retaining head of the torch; and
   a back adapter disposed at and mounted on the back end of the tubular body, the back adapter being fitable in one of a gooseneck and body block of the welding torch;
   wherein the front adapter provides sealing between the jump liner and the retaining head to prevent back flow leakage of shielding gas, the front adapter prevents deformation of the tubular body at elevated temperatures, and the back adapter provides sealing between the jump liner and the gooseneck or body block.

2. The jump liner of claim 1, wherein the front adapter is made of metal.

3. The jump liner of claim 1, wherein the front adapter is heat resistant.

4. The jump liner of claim 1, wherein the front adapter is generally cylindrical and includes a flanged portion at an inner end and an elongated smaller diameter portion at an outer end, the elongated smaller diameter portion having a smaller outer diameter than an outer diameter of the flanged portion.

5. The jump liner of claim 1, wherein the back adapter is generally cylindrical and includes a shoulder, the shoulder including a recess and a seal retained therein.

6. The jump liner of claim 5, wherein the seal is an O-ring.

7. A push-pull MIG welding torch comprising:
a handle;
a body block disposed in the handle;
a gooseneck having front and back ends;
the handle being connected to the back end of the gooseneck;
a contact tip assembly connected to the front end of the gooseneck;
a jump liner extending through the gooseneck from the handle to the contact tip assembly;
the jump liner including:
an elongated tubular body having front and back ends, the body being made of a flexible plastic material;
a front adapter disposed at and mounted on the front end of the tubular body and thread fit on the tubular body, the front adapter being fitable in the contact tip assembly; and
a back adapter disposed at and mounted on the back end of the tubular body, the back adapter being fitable in one of the gooseneck and body block;
wherein the front adapter provides sealing between the jump liner and the contact tip assembly to prevent back flow leakage of shielding gas, the front adapter prevents deformation of the tubular body at elevated temperatures, and the back adapter provides sealing between the jump liner and the gooseneck or body block.

* * * * *